United States Patent
Guo et al.

(10) Patent No.: US 10,341,157 B2
(45) Date of Patent: Jul. 2, 2019

(54) METHOD FOR SYMBOL COMPENSATION AND RECEIVER

(71) Applicant: Telefonaktiebolaget LM Ericsson (publ), Stockholm (SE)

(72) Inventors: Zhiheng Guo, Beijing (CN); Shaohua Li, Beijing (CN); Xinghua Song, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 58 days.

(21) Appl. No.: 15/534,189

(22) PCT Filed: Dec. 29, 2014

(86) PCT No.: PCT/CN2014/095301
§ 371 (c)(1),
(2) Date: Jun. 8, 2017

(87) PCT Pub. No.: WO2016/106490
PCT Pub. Date: Jul. 7, 2016

(65) Prior Publication Data
US 2017/0338993 A1    Nov. 23, 2017

(51) Int. Cl.
*H04L 27/26* (2006.01)
*H04L 27/38* (2006.01)
*H04L 1/00* (2006.01)

(52) U.S. Cl.
CPC ........ *H04L 27/2647* (2013.01); *H04L 1/0079* (2013.01); *H04L 27/26* (2013.01);
(Continued)

(58) Field of Classification Search
CPC ............. H04L 27/2647; H04L 1/0079; H04L 27/2613; H04L 27/2605; H04L 27/3809; H04L 27/26
(Continued)

(56) References Cited

U.S. PATENT DOCUMENTS 7,616,718 B2   11/2009  Sato
7,668,266 B2   2/2010   Chen et al.
(Continued)

FOREIGN PATENT DOCUMENTS

| CN | 101043480 A | 9/2007 | |
| CN | 103580800 | * 2/2014 | ............... H04L 1/00 |
| CN | 103580800 A | 2/2014 | |

OTHER PUBLICATIONS

International Search Report and Written Opinion for International Patent Application No. PCT/CN2014/095301, dated Sep. 11, 2015, 12 pages.
(Continued)

*Primary Examiner* — Chieh M Fan
*Assistant Examiner* — Fitwi Y Hailegiorgis
(74) *Attorney, Agent, or Firm* — Sage Patent Group

(57) ABSTRACT

The present disclosure provides a method for symbol compensation. The method comprises, for a symbol consisting of a first portion and a second portion: estimating a length of the first portion; calculating an average power of the first portion and an average power of the second portion based on the length of the first portion; determining a relative scaling factor by which the average power of the first portion is scaled relative to that of the second portion; and compensating for the first portion based on the relative scaling factor.

16 Claims, 6 Drawing Sheets

(52) U.S. Cl.
CPC ...... *H04L 27/2605* (2013.01); *H04L 27/2613* (2013.01); *H04L 27/3809* (2013.01)

(58) Field of Classification Search
USPC .................................. 375/260; 370/311, 336
See application file for complete search history.

(56) References Cited

U.S. PATENT DOCUMENTS

| | | |
|---|---|---|
| 2011/0293051 A1 | 12/2011 | Lozhkin |
| 2012/0120924 A1* | 5/2012 | Montojo ............... H04W 48/12 370/336 |
| 2013/0136165 A1 | 5/2013 | Shirakata et al. |
| 2015/0043413 A1* | 2/2015 | Haim .................. H04W 52/146 370/311 |
| 2017/0195028 A1* | 7/2017 | Shimezawa ........... H04W 24/10 |

OTHER PUBLICATIONS

Extended European Search Report for European Patent Application No. 14909303.1, dated Jun. 12, 2018, 7 pages.

Author Unknown, "Technical Specification Group Radio Access Network; Evolved Universal Terrestrial Radio Access (E-UTRA); Physical layer procedures (Release 11)," Technical Specification 36.213, Version 11.9.0, 3GPP Organizational Partners, Dec. 2014, 182 pages.

* cited by examiner

METHOD FOR SYMBOL COMPENSATION AND RECEIVER

This application is a 35 U.S.C. § 371 national phase filing of International Application No. PCT/CN2014/095301, filed Dec. 29, 2014, the disclosure of which is incorporated herein by reference in its entirety.

TECHNICAL FIELD

The disclosure relates to communication technology, and more particularly, to a method for symbol compensation and a receiver.

BACKGROUND

In the Long Term Evolution (LTE) system, the Single Carrier Frequency Division Multiple Access (SC-FDMA) technique is expected to be used for uplink (UL) transmission, i.e., from a User Equipment (UE) to an evolved NodeB (eNB).

FIG. 1 shows a UL subframe structure (normal Cyclic Prefix (CP), no sounding reference signal) in the LTE system. As shown, one UL subframe includes two slots each containing 7 Orthogonal Frequency Division Multiplexing (OFDM) symbols. In the UL subframe, symbols #3 and #10 are UL reference symbols, or Demodulation Reference Signals (DMRSs), and the remaining symbols are data symbols. In order for the receiver (e.g., an eNB) to demodulate and decode the UL subframe, it is desired that the reference symbols and the data symbols have the same transmit power.

In the 3$^{rd}$ Generation Partnership Project (3GPP) LTE Release 11, a UE may have more than one UL transmission, e.g., on different carriers in a Carrier Aggregation (CA) scenario or to different access points (e.g., eNBs or Radio Remote Units (RRUs)) in a Dual Connectivity (DC) scenario. The UE may receive different Timing Advance (TA) commands for adjustment of its transmission timing for the respective UL transmissions. In this case, these UL transmissions may overlap each other.

FIG. 2 shows an example of overlap of UL transmissions. In this example, a UE has two UL transmissions, denoted as UL1 and UL2, respectively. As shown in FIG. 2, the last symbol (symbol #13) of the subframe #0 in UL1 overlaps the first symbol (symbol #0) of the subframe #1 in UL2, e.g., due to different TAs. In the overlapped portion, the transmit power of UL1 and/or UL2 may be forced to be reduced (depending on resource allocations to UL1 and UL2), such that the total transmit power in the overlapped portion will not exceed a preconfigured maximum transmit power of the UE. In the following, the subframe #1 in UL2 will be discussed as an example, without loss of generality.

FIG. 3 shows the subframe #1 in UL2 of FIG. 2, in which symbol #0 contains the overlapped portion. It is assumed here that UL1 is mute in the subframe #1. In this case, only the overlapped portion in the subframe #1 of UL2 has its transmit power reduced due to the limit of the maximum transmit power, while the transmit powers of the non-overlapped portion of symbol #0 and the remaining symbols of the subframe #1 remain unchanged. That is, the transmit power of the overlapped portion is scaled down relative to that of the DMRSs. In other words, the subframe is distorted.

FIG. 4 shows an example of a 16QAM (Quadrature Amplitude Modulation) constellation. If this is the original, non-scaled modulation constellation for the symbols #0-13 shown in FIG. 3, assuming a scaling factor of 5 dB, the modulation constellation for the overlapped portion will become distorted as shown in FIG. 5.

After receiving this subframe, an eNB first applies Fast Fourier Transform (FFT) to the received subframe, extracts OFDM symbols in the frequency domain, and obtains a channel estimation based on the DMRSs in symbols #3 and #10. Then, it applies frequency domain equalization and Inverse Discrete Fourier Transform (IDFT) to the OFDM symbols based on the channel estimation, computes soft bits and finally decodes the symbols. Since the transmit power of the overlapped portion is scaled relative to that of the DMRSs, the demodulation/decoding performance of the overlapped portion may be severely degraded when the channel estimation based on the DRMSs is applied. In turn, the demodulation/decoding performance of the entire subframe would be severely degraded due to error propagation. Accordingly, the subframe would contain random Cyclic Redundancy Check (CRC) errors due to not only channel quality, but also the distortion, which results in unstable link adaptation.

There is thus a need for a solution for improving the demodulation/decoding performance when such distortion occurs.

SUMMARY

It is an object of the present disclosure to provide a method for symbol compensation and a receiver, capable of compensating for the above described distortion, or at least mitigating the impact of such distortion on the overall demodulation/decoding performance.

In a first aspect, a method for symbol compensation is provided. The method comprises, for a symbol consisting of a first portion and a second portion: estimating a length of the first portion; calculating an average power of the first portion and an average power of the second portion based on the length of the first portion; determining a relative scaling factor by which the average power of the first portion is scaled relative to that of the second portion; and compensating for the first portion based on the relative scaling factor.

In an embodiment, the symbol is an Orthogonal Frequency Division Multiplexing (OFDM) symbol containing a set of constellation symbols in a modulation constellation.

In an embodiment, the step of estimating comprises: creating a sequence of amplitude values comprising amplitude values of constellation symbols in the set that are mapped onto constellation points with highest amplitude values in the modulation constellation; deriving a threshold based on the sequence; and estimating the length of the first portion based on the number of amplitude values preceding the first amplitude value in the sequence that is larger than the threshold.

In an embodiment, the amplitude value of each constellation symbol comprises the amplitude of its real part and/or the amplitude of its imaginary part.

In an embodiment, the step of deriving comprises: deriving, as the threshold, an average of a number of values at the beginning of the sequence and that number of values at the end of the sequence.

In an embodiment, the method further comprises: obtaining an envelope of the sequence by applying a low pass filter to the sequence. The threshold is an average of a number of values at the beginning of the envelope and that number of values at the end of the envelope and the length of the first portion based on the number of values preceding the first value in the envelope that is larger than the threshold.

In an embodiment, the method further comprises: removing, prior to the step of deriving, a number of amplitude values from the sequence, the number being dependent on a ratio of a length of a cyclic prefix in the OFDM symbol to a length of the OFDM symbol.

In an embodiment, the step of estimating comprises: estimating the length of the first portion based on a difference between a timing advance associated with the symbol and a timing advance associated with another symbol that overlaps the symbol over the first portion.

In an embodiment, the method further comprises, prior to the step of compensating: determining that the relative scaling factor is larger than a first threshold.

In an embodiment, the method further comprises, after the step of determining the relative scaling factor: setting the first portion to zero when the relative scaling factor is larger than a second threshold. The second threshold is higher than the first threshold.

In an embodiment, the method further comprises, prior to the step of setting: determining that a ratio of the length of the first portion to a length of the symbol does not exceed a predetermined upper limit at a given coding rate.

In an embodiment, the method further comprises: computing soft bits for each constellation symbol in the OFDM symbol having the first portion compensated, while applying to the compensated first portion a Signal to Interference and Noise Ratio (SINR) scaled by the relative scaling factor.

In a second aspect, a receiver for compensation for a symbol consisting of a first portion and a second portion is provided. The receiver comprises: an estimating unit configured to estimate a length of the first portion; a calculating unit configured to calculate an average power of the first portion and an average power of the second portion based on the length of the first portion; a determining unit configured to determine a relative scaling factor by which the average power of the first portion is scaled relative to that of the second portion; and a compensating unit configured to compensate for the first portion based on the relative scaling factor.

The above embodiments of the first aspect are also applicable for the second aspect.

With the embodiments of the present disclosure, when a symbol contains a first portion and a second portion and the average power of the first portion is scaled relative to that of the second portion, the length of the first portion can be estimated. Then, the relative scaling factor by which the average power of the first portion is scaled relative to that of the second portion can be determined and the first portion can be compensated for based on the relative scaling factor. Alternatively, the first portion can be set to zero. In this way, it is possible to compensate for the above described distortion, or at least mitigate the impact of such distortion on the overall demodulation/decoding performance.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

Figure 6:
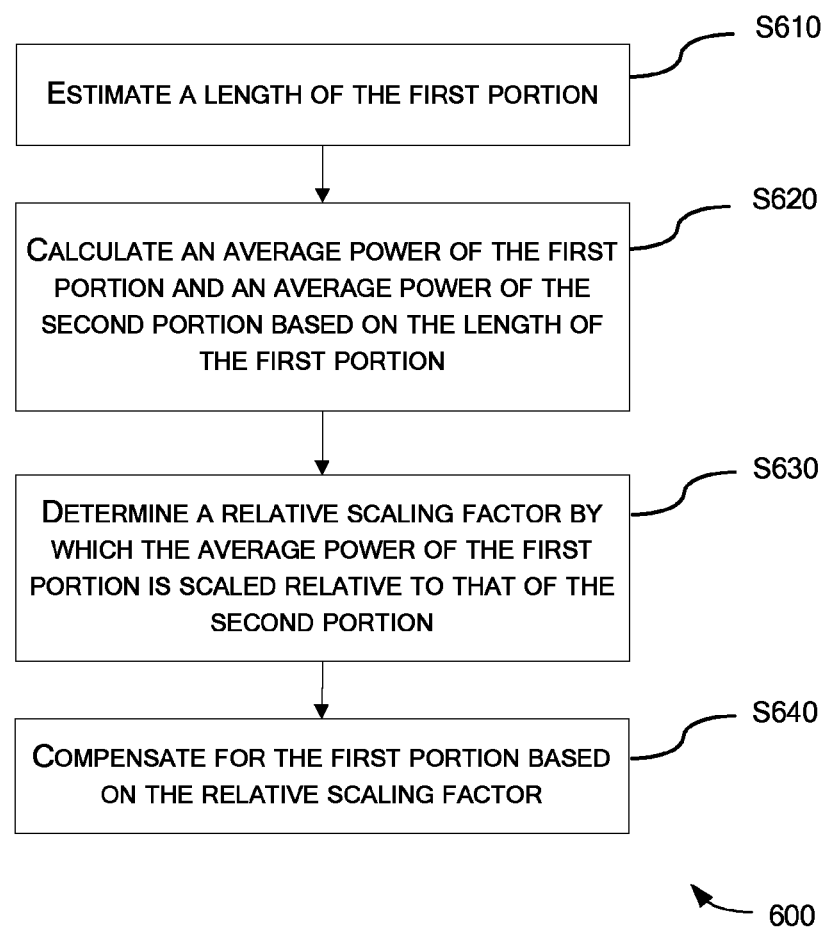
FIG. 6 is a flowchart illustrating a method for symbol compensation according to an embodiment of the present disclosure.

FIG. 6 is a flowchart illustrating a method 600 for symbol compensation according to an embodiment of the present disclosure. The method 600 can be performed at a receiver, e.g., an eNB or a receiving terminal in a Device-to-Device (D2D) communication, after receiving a symbol consisting of a first portion and a second portion. In the following, the method 600 will be described with reference to an example where the symbol is an OFDM symbol containing a set of constellation symbols in a modulation constellation, e.g., symbol #1 as described above in connection with FIGS. 2-5. The OFDM symbol is obtained after FFT transform, symbol extraction in frequency domain, frequency domain equalization and IDFT at the receiver. However, it can be appreciated by those skilled in the art that the present disclosure is not limited to OFDM symbol. Rather, it can be applied to any symbol having a first portion scaled relative to a second portion.

The method 600 includes the following steps.

At step S610, a length of the first portion is estimated.

In an example, in the step S610, the length of the first portion can be estimated as follows. It is assumed here that the OFDM symbol contains constellation symbols being represented as:

$$e_0, e_1, \ldots e_{N-1} \qquad (1)$$

where N denotes the number of the constellation.

First, a sequence of amplitude values is created. The sequence includes amplitude values of constellation symbols in the set of constellation symbols that are mapped onto constellation points with highest amplitude values in the modulation constellation. For example, when the modulation constellation is a 16QAM constellation shown in FIGS. 4 and 5, the constellation points with highest amplitude values in the modulation constellation are the constellation points at the four corners of the constellation. When the modulation constellation has constant amplitude (such as Quadrature Phase Shift Keying (QPSK) or Binary Phase Shift Keying (BPSK)), each constellation point in the modulation constellation is considered to have "the highest amplitude value". Alternatively, the sequence may include amplitude values of constellation symbols that are mapped onto constellation points with lowest or any other particular amplitude values in the modulation constellation.

Here, the amplitude value of a constellation symbol $e_n$, $n=0, 1, \ldots N$ can be $|e_n|$. When a complex modulation constellation is used, without loss of generality, a constellation symbol $e_n$, $n=0, 1, \ldots N$ can be split into:

$$d_{2n}=\text{real}(e_n), d_{2n+1}=\text{imag}(e_n) \qquad (2).$$

In this case, the amplitude value of $e_n$ can be represented as the amplitude of its real part and/or the amplitude of its imaginary part. That is, the amplitude value of $e_n$ can be represented by $|d_{2n}|$, $|d_{2n+1}|$ or both. In the following example, it is assumed that the amplitude value of $e_n$ is represented by both $|d_{2n}|$ and $|d_{2n+1}|$.

A vector $g_i$ is calculated as:

$$g_i = \max(|d_i|, |d_{(i+1) mod 2N}|, \ldots |d_{(i+M-1) mod 2N}|), i = 0,1,\ldots 2N-1 \qquad (3)$$

where $M=\text{floor}(N/x)$ (e.g., $x=100$) and mod( ) denotes modulo operation. It is to be noted that the value of x is not limited to 100 but may vary depending on desired accuracy and complexity. The sequence can be represented as:

$$g_0, g_1, \ldots g_{2N-1} \qquad (4).$$

Figure 7:
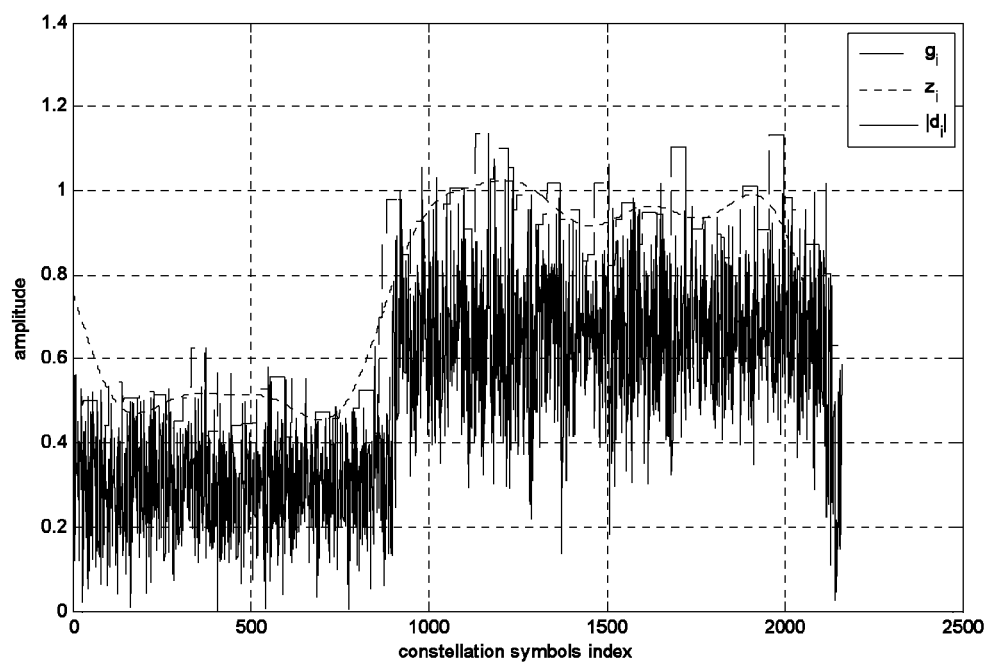
FIG. 7 is a diagram for explaining the principle of the method in FIG. 6.

Reference is now made to FIG. 7. It is assumed here that $N=1080$ (90 Resource Blocks (RB) with 12 subcarriers per RB) and the modulation constellation is 16QAM. FIG. 7 shows curves of $d_i$ and $g_i$. It can be seen that each point on the curve of $g_i$ basically represents the highest amplitude value among $M=10$ consecutive points on the curve of $d_i$. In this way, the sequence of $g_0, g_1, \ldots g_{2N-1}$ includes amplitude values, $|d_i|$, that are mapped onto the four corners of the 16QAM constellation, although it may also include some amplitude values that are mapped onto the other constellation points in the 16QAM constellation (e.g., when there are 10 consecutive values of $|d_i|$ that are not mapped onto the four corners of the 16QAM constellation).

Alternatively, when the modulation constellation has constant amplitude (such as QPSK or BPSK), we have:

$$g=|d_i|, i=0,1, \ldots 2N-1 \qquad (5).$$

Figure 8:
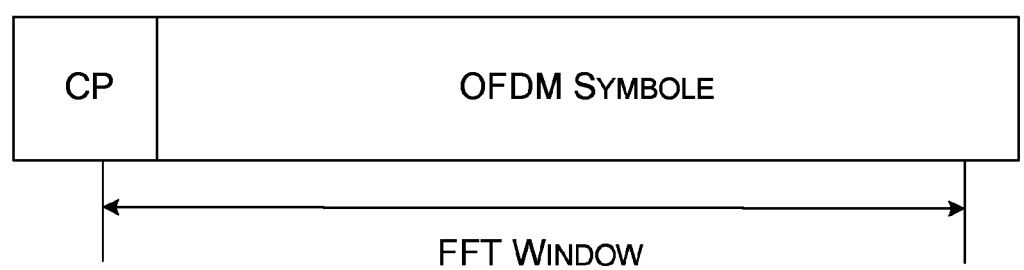
FIG. 8 is a schematic diagram showing FFT window selection.

Here, preferably, a number, L, of amplitude values can be removed from the sequence due to FFT window selection in the FFT transform. FIG. 8 shows such FFT window selection. As shown in FIG. 8, during the FFT transform, a part of CP (which may belong to the first portion) may be selected and copied to the end of the symbol (which is presumed as belonging to the second portion). Here $L=L_{CP}*2$, where $L_{CP}$ is the length of CP added to the OFDM symbol, represented in number of constellation symbols. The removal of the L amplitude values from the sequence avoids any potential risk that some amplitude values at the end of the symbol actually come from the first portion. In this case, the sequence becomes $g_0, g_1, \ldots g_{2N-L-1}$. The process described below is based on the sequence $g_0, g_1, \ldots g_{2N-L-1}$. However, it can be appreciated by those skilled in the art that such removal would be more beneficial in some scenario, e.g., when the symbol is an OFDM symbol.

Then, an envelope of the sequence can be derived by applying a Low Pass Filter (LPF) to the sequence. In doing so, a DFT is applied to $g_0, g_1, \ldots g_{2N-L-1}$ first to transform the sequence to the frequency domain:

$$h_k = \sum_{i=0}^{2N-L-1} g_i e^{-2\pi jki/(2N-L)}, k=0, 1, \ldots 2N-L-1. \qquad (6)$$

A low pass filter can be applied by setting high frequency elements of $h_k$ to zero:

$$h_k = \begin{cases} 0, & w < k < 2N-L-w \\ h_k, & \text{else} \end{cases} \qquad (7)$$

where w denotes a stop band of the LPF, e.g., $w=M$.

Then an IDFT can be applied to $h_k$ to transform it back to the time domain, so as to yield the envelope:

$$z_k = \left| \sum_{i=0}^{2N-L-1} h_i e^{-2\pi jki/(2N-L)} \right|, k=0, 1, \ldots 2N-L-1. \qquad (8)$$

The waveform of the envelope is also shown in FIG. 7.

It is to be noted here that the LPF is not necessary, e.g., when QPSK or BPSK modulation is used.

Then, a threshold is derived based on the sequence. In particular, the threshold can be an average of a number of values at the beginning of the sequence and that number of values at the end of the sequence. For example, the threshold can be an average of any one, two, three, four or five of the first five values in the sequence and any one, two, three, four or five of the last five values in the sequence. In the simplest case, the threshold can be an average of the first value and the last value in the sequence, that is:

$$Th=(g_0+g_{2N-L-1})/2 \qquad (9).$$

Alternatively, when the envelope has been derived, the threshold can be an average of a number of values at the beginning of the envelope and that number of values at the end of the envelope. In the simplest case, the threshold can be an average of the first value and the last value in the envelop:

$$Th'=(z_0+z_{2N-L-1})/2 \qquad (10)$$

Next, the length of the first portion can be estimated based on the number of amplitude values preceding the first amplitude value in the sequence that is larger than the threshold. Let $g_{id}$ be the first amplitude value in the sequence that satisfies $g_{id}>Th$, the length of the first portion can be estimated as:

$$L_1=\text{floor}(g_{id}/2)+1 \qquad (11).$$

Alternatively, when the envelope has been derived, the length of the first portion based on the number of values preceding the first value in the envelope that is larger than the threshold. Let $z_{id}$ be the first value in the envelope that satisfies $z_{id}>Th'$, the length of the first portion can be estimated as:

$$L_1=\text{floor}(z_{id}/2)+1 \qquad (12).$$

Figure 1:
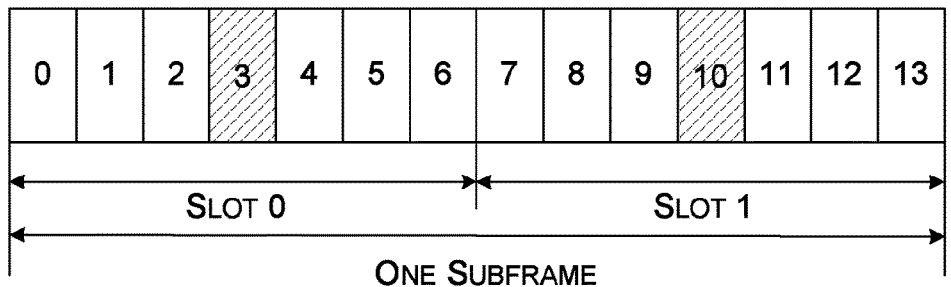
FIG. 1 is a schematic diagram showing a UL subframe structure.
Figure 2:
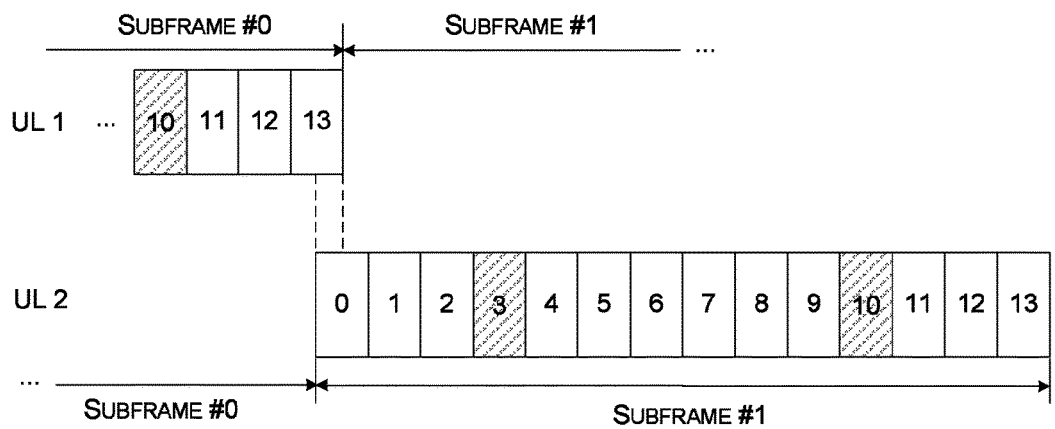
FIG. 2 is a schematic diagram showing an example of overlap of UL transmissions.
Figure 3:
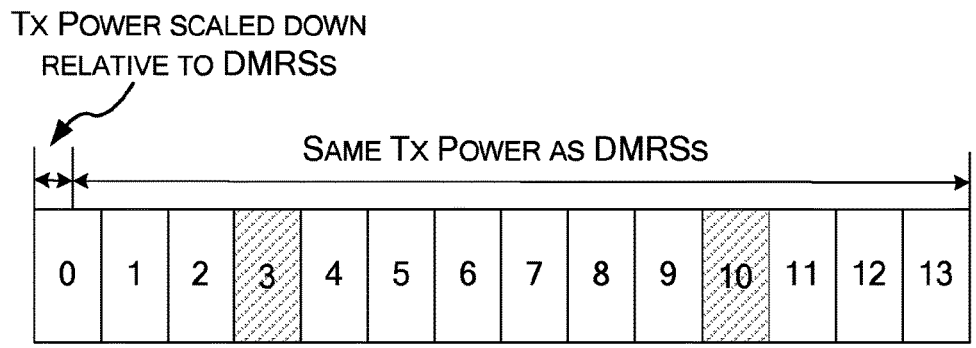
FIG. 3 is a schematic diagram showing transmit power reduction due to the overlap in FIG. 2.
Figure 4:
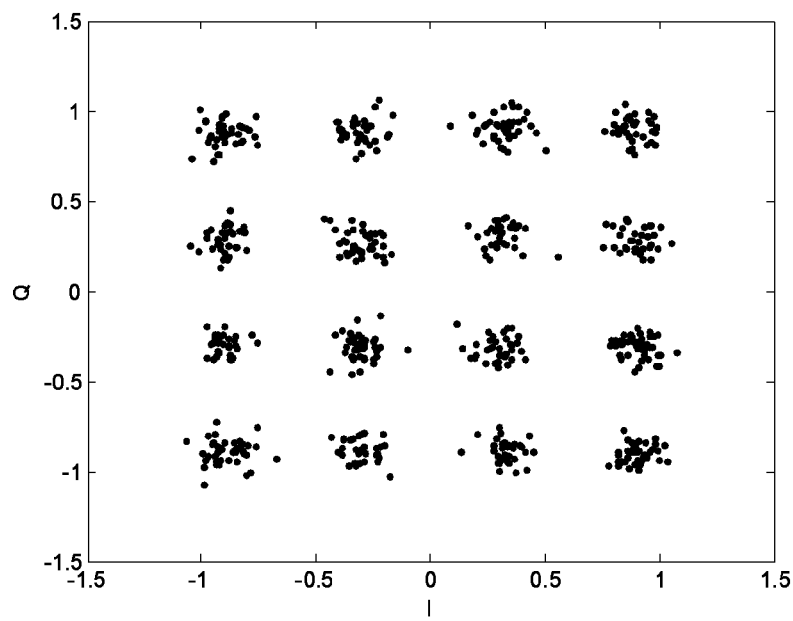
FIG. 4 is a schematic diagram showing an example of a 16QAM constellation.
Figure 5:
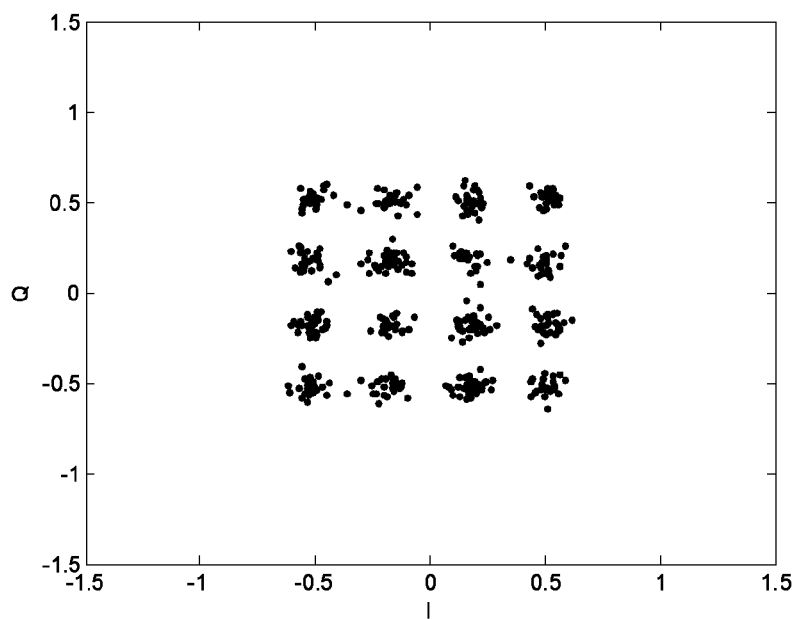
FIG. 5 is a schematic diagram showing a distorted version of the 16QAM constellation in FIG. 4.

Alternatively, in the step S610, the length of the first portion can be estimated based on a difference between a timing advance associated with the symbol and a timing advance associated with another symbol that overlaps the symbol over the first portion. Referring to FIG. 2 for example, in the carrier aggregation scenario, the receiver (e.g., eNB) knows the TA associated with UL1, denoted as $TA_1$, and the TA associated with UL2, denoted as $TA_2$. In this case, assuming that each of $TA_1$ and $TA_2$ is an integer in units of $16T_s$ ($T_s$ denotes sampling period), the length of the first portion can be estimated as:

$$L_1=|TA_1-TA_2|*16 \qquad (13).$$

At step S620, an average power of the first portion and an average power of the second portion are calculated based on the length of the first portion.

Here, the average power of the first portion can be calculated as:

$$P_1 = \text{mean}(|d_i|^2), 0 \le i < id \quad (14)$$

The average power of the second portion can be calculated as:

$$P_2 = \text{mean}(|d_i|^2), id \le i \le 2N-L-1 \quad (15)$$

At step S630, a relative scaling factor by which the average power of the first portion is scaled relative to that of the second portion is determined.

Here, the relative scaling factor can be calculated as:

$$\gamma = \beta * P_1/P_2 \quad (16)$$

where β is an optional adjustment coefficient and can be set to e.g., 1~1.1.

At step S640, the first portion is compensated for based on the relative scaling factor. Here, the compensation in the step S640 can be done by applying the following equation:

$$d'_i = \begin{cases} d_i/\sqrt{\gamma}, & 0 \le i < id \\ d_i, & id \le i \le 2N-L-1 \end{cases} \quad (17)$$

In an example, prior to the compensation in the step S640, it is determined that the relative scaling factor is larger than a first threshold. In this case, the step S640 is performed when the relative scaling factor is larger than the first threshold (e.g., 3 dB), so as to avoid unnecessary compensation when the relative scaling factor is too small.

After the first portion is compensated for in the step S640, soft bits can be computed for each constellation symbol in the OFDM symbol having the first portion compensated, while a Signal to Interference and Noise Ratio (SINR) scaled by the relative scaling factor is applied to the compensated first portion. As an example, when the modulation constellation is 16QAM, the soft bits can be calculated as:

$$t = 2/\sqrt{10} \quad (18)$$

$$b_{4i+3} = \begin{cases} \mu * \gamma * (|imag(d'_i)| - t), & 0 \le i < id \\ \mu * (|imag(d'_i)| - t), & id \le i \le 2N-L-1 \end{cases}$$

$$b_{4i+2} = \begin{cases} \mu * \gamma * (|real(d'_i)| - t), & 0 \le i < id \\ \mu * (|real(d'_i)| - t), & id \le i \le 2N-L-1 \end{cases}$$

$$b_{4i+1} = \begin{cases} \mu * \gamma * imag(d'_i), & 0 \le i < id \\ \mu * imag(d'_i), & id \le i \le 2N-L-1 \end{cases}$$

$$b_{4i+1} = \begin{cases} \mu * \gamma * real(d'_i), & 0 \le i < id \\ \mu * real(d'_i), & id \le i \le 2N-L-1 \end{cases}$$

where t is a constant parameter used for 16QAM demodulation, μ is the SINR estimated based on DMRSs.

Then, the OFDM symbol can be decoded (e.g., turbo decoded) jointly with other OFDM symbols in the same subframe based on the soft bits.

It is to be noted here that there may be a case where the overlap between two transmissions exceeds one symbol. For example, if in FIG. 2 the subframe #0 in UL1 overlaps the symbol #0 and a part of the symbol #1 of the subframe #1 in UL2, the above method 600 can be applied to the symbol #1 to estimate the length of the part and determine the relative scaling factor. Then, the entire symbol #0 can be compensated for based on the relative scaling factor. In this case, when computing the soft bits for the symbol #0, a SINR scaled by the relative scaling factor is also applied to the compensated symbol #0.

In an example, when the relative scaling factor is larger than a second threshold higher than the first threshold, the first portion is set to zero based on the length of the first portion, i.e., the first portion is punctured. As an example, the second threshold can be 15 dB.

In an example, prior to setting the first portion to zero, it is determined that a ratio of the length of the first portion to a length of the symbol does not exceed a predetermined upper limit at a given coding rate. That is, $$L_1/N \le (1-CR/\alpha) * n_{OFDM} \quad (19)$$

where CR denotes the coding rate for the OFDM symbol, α denotes a maximum allowable ratio of information bits to coded bits, and $n_{OFDM}$ denotes the number of OFDM symbols in a subframe.

Again, there may be a case where the overlap between two transmissions exceeds one symbol. For example, if in FIG. 2 the subframe #0 in UL1 overlaps the symbol #0 and a part of the symbol #1 of the subframe #1 in UL2, the above method 800 can be applied to the symbol #1 to estimate the length of the part. Then, the entire symbol #0 can be set to zero, e.g., when $$L_1/N \le (1-CR/\alpha) * n_{OFDM} - 1 \quad (20)$$

Figure 9:
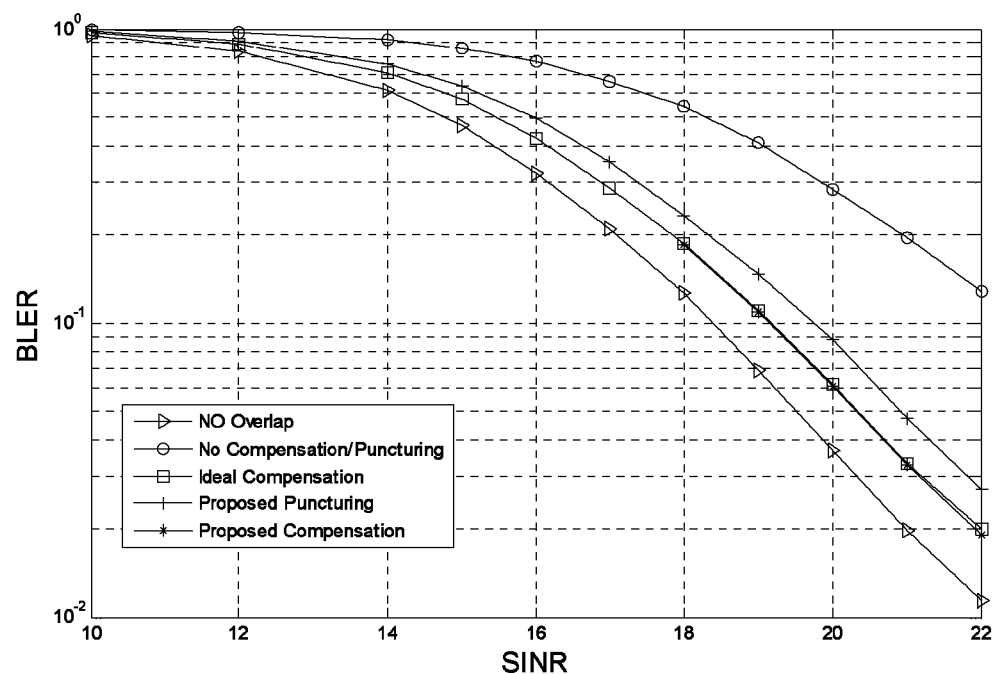
FIG. 9 is a simulation diagram showing Block Error Rate (BLER) performance of the method in FIG. 6.

FIG. 9 is a simulation diagram showing Block Error Rate (BLER) performance of the method 600 in FIG. 6 versus SINR. The BLER performances of the scheme for compensating for the first portion and the scheme for setting the first portion to zero are labeled as "Proposed Compensation" and "Proposed Puncturing", respectively. For comparison, FIG. 9 also shows BLER performances in cases where there is no overlap between transmissions (thus no transmit power reduction) (labeled as "No Overlap"), no compensation or puncturing is done (labeled as "No Compensation/Puncturing") and compensation is done with ideal estimation of the overlap length and the relative scaling factor (labeled as "Ideal Compensation"). The parameters for the simulation are listed in Table 1 below.

TABLE 1

Simulation Parameters

| Parameter | Value |
| --- | --- |
| Carrier frequency | 2.6 GHz |
| Subcarrier spacing | 15 KHz |
| System bandwidth | 20 MHz |
| ulMCS | 18 |
| Modulation | 16QAM |
| Number of antennas | 1 × 1 |
| Allocated number of RB | 90 |
| Doppler frequency | 70 Hz |
| Channel model | EVA |
| Time length of the overlapped portion | 30 μs |
| Tx power reduction | 10 dB |

It can be seen that both the compensating and puncturing schemes outperform the conventional scheme where no compensation or puncturing is done. The BLER performance of the compensating scheme is comparable to that of the ideal compensation at high SINRs. The puncturing scheme also achieves a performance gain of around 3 dB when the Tx power reduction is rather high, as shown in the above table.

Figure 10:
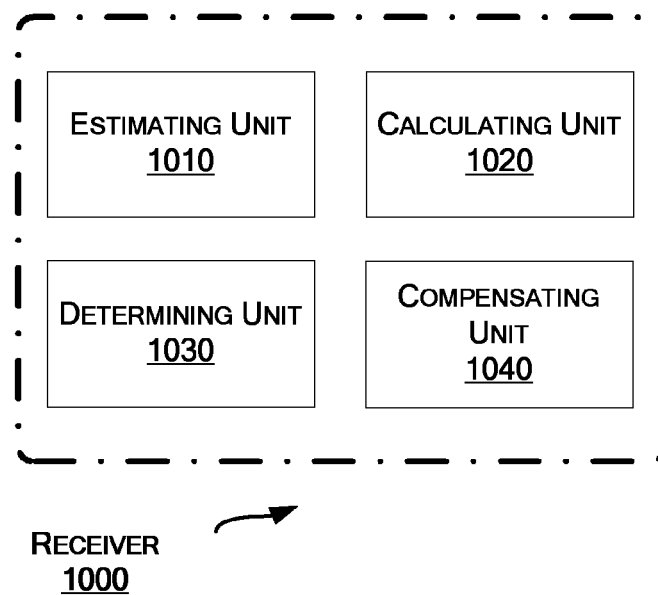
FIG. 10 is a block diagram of a receiver for symbol compensation according to an embodiment of the present disclosure.

Correspondingly to the method 600 as described above, a receiver is provided. FIG. 10 is a block diagram of a receiver 1000 for compensation for a symbol according to an embodiment of the present disclosure. The symbol consists of a first portion and a second portion. The receiver 1000 is e.g., an eNB or a receiving terminal in a D2D communication.

As shown in FIG. 10, the receiver 1000 includes an estimating unit 1010 configured to estimate a length of the first portion. The receiver 1000 further includes a calculating unit 1020 configured to calculate an average power of the first portion and an average power of the second portion based on the length of the first portion. The receiver 1000 further includes a determining unit 1030 configured to determine a relative scaling factor by which the average power of the first portion is scaled relative to that of the second portion. The receiver 1000 further includes a compensating unit 1040 configured to compensate for the first portion based on the relative scaling factor.

In an embodiment, the symbol is an Orthogonal Frequency Division Multiplexing (OFDM) symbol containing a set of constellation symbols in a modulation constellation.

In an embodiment, the estimating unit 1010 is configured to create a sequence of amplitude values comprising amplitude values of constellation symbols in the set that are mapped onto constellation points with highest amplitude values in the modulation constellation; derive a threshold based on the sequence; and estimate the length of the first portion based on the number of amplitude values preceding the first amplitude value in the sequence that is larger than the threshold.

In an embodiment, the amplitude value of each constellation symbol comprises the amplitude of its real part and/or the amplitude of its imaginary part.

In an embodiment, an average of a number of values at the beginning of the sequence and that number of values at the end of the sequence is derived as the threshold.

In an embodiment, the estimating unit 1010 is further configured to obtain an envelope of the sequence by applying a low pass filter to the sequence. An average of a number of values at the beginning of the envelope and that number of values at the end of the envelope is derived as the threshold and the length of the first portion based on the number of values preceding the first value in the envelope that is larger than the threshold.

In an embodiment, the estimating unit 1010 is further configured to remove, prior to deriving the threshold, a number of amplitude values from the sequence, the number being dependent on a ratio of a length of a cyclic prefix in the OFDM symbol to a length of the OFDM symbol.

In an embodiment, the estimating unit 1010 is configured to estimate the length of the first portion based on a difference between a timing advance associated with the symbol and a timing advance associated with another symbol that overlaps the symbol over the first portion.

In an embodiment, the compensating unit 1040 is configured to determine, prior to compensating for the first portion, that the relative scaling factor is larger than a predetermined threshold.

In an embodiment, the compensating unit 1040 is further configured to set the first portion to zero when the relative scaling factor is larger than a second threshold. The second threshold is higher than the first threshold.

In an embodiment, the compensating unit 1040 is further configured to, prior to setting the first portion to zero, determine that a ratio of the length of the first portion to a length of the symbol does not exceed a predetermined upper limit at a given coding rate.

In an embodiment, the receiver 1000 further comprises (not shown): a computing unit configured to compute soft bits for each constellation symbol in the OFDM symbol having the first portion compensated, while applying to the compensated first portion a Signal to Interference and Noise Ratio (SINR) scaled by the relative scaling factor.

Each of the units 1010-1040 can be implemented as a pure hardware solution or as a combination of software and hardware, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 6.

Figure 11:
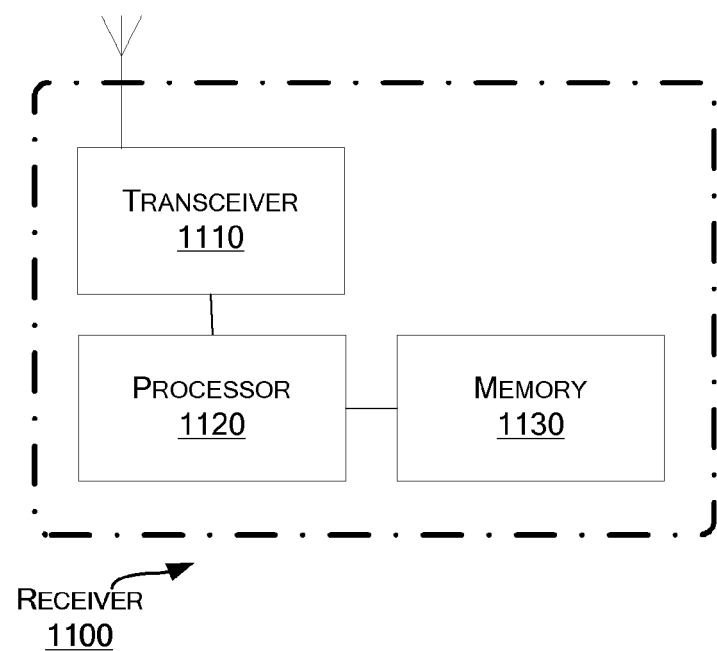
FIG. 11 is a block diagram of a receiver according to another embodiment of the present disclosure.

FIG. 11 is a block diagram a block diagram of a receiver 1100 according to another embodiment of the present disclosure. The receiver 1100 is e.g., an eNB or a receiving terminal in a D2D communication.

The receiver 1100 includes a transceiver 1110, a processor 1120 and a memory 1130. The memory 1130 contains instructions executable by the processor 1120 whereby the receiver 1100 is operative to compensate for a symbol consisting of a first portion and a second portion by: estimating a length of the first portion; calculating an average power of the first portion and an average power of the second portion based on the length of the first portion; determining a relative scaling factor by which the average power of the first portion is scaled relative to that of the second portion; and compensating for the first portion based on the relative scaling factor.

The present disclosure also provides at least one computer program product in the form of a non-volatile or volatile memory, e.g., an Electrically Erasable Programmable Read-Only Memory (EEPROM), a flash memory and a hard drive. The computer program product includes a computer program. The computer program includes: code/computer readable instructions, which when executed by the processor 1120 causes the receiver 1100 to perform the actions, e.g., of the procedure described earlier in conjunction with FIG. 6.

The computer program product may be configured as a computer program code structured in computer program modules. The computer program modules could essentially perform the actions of the flow illustrated in FIG. 6.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method for symbol compensation, comprising, for a symbol consisting of a first portion and a second portion, wherein the symbol is an Orthogonal Frequency Division Multiplexing (OFDM) symbol containing a set of constellation symbols in a modulation constellation:
    estimating a length of the first portion, wherein estimating comprises:
        creating a sequence of amplitude values comprising amplitude values of constellation symbols in the set that are mapped onto constellation points with highest amplitude values in the modulation constellation;
        deriving a threshold based on the sequence; and
        estimating the length of the first portion based on the number of amplitude values preceding a first amplitude value in the sequence that is larger than the threshold;
    calculating an average power of the first portion and an average power of the second portion based on the length of the first portion;
    determining a relative scaling factor by which the average power of the first portion is scaled relative to that of the second portion; and
    compensating for the first portion based on the relative scaling factor.

2. The method of claim 1, wherein the amplitude value of each constellation symbol comprises the amplitude of its real part and/or the amplitude of its imaginary part.

3. The method of claim 1, wherein said deriving comprises:
    deriving, as the threshold, an average of a number of values at the beginning of the sequence and that number of values at the end of the sequence.

4. The method of claim 1, further comprising:
    obtaining an envelope of the sequence by applying a low pass filter to the sequence, wherein the threshold is an average of a number of values at the beginning of the envelope and that number of values at the end of the envelope and the length of the first portion based on the number of values preceding a first value in the envelope that is larger than the threshold.

5. The method of claim 1, wherein said estimating comprises:
    estimating the length of the first portion based on a difference between a timing advance associated with the symbol and a timing advance associated with another symbol that overlaps the symbol over the first portion.

6. The method of claim 1, further comprising, prior to said compensating:
    determining that the relative scaling factor is larger than a first threshold.

7. The method of claim 6, further comprising, after said determining the relative scaling factor:
    setting the first portion to zero when the relative scaling factor is larger than a second threshold, wherein the second threshold is higher than the first threshold.

8. The method of claim 1, further comprising, prior to said setting:
    determining that a ratio of the length of the first portion to a length of the symbol does not exceed a predetermined upper limit at a given coding rate.

9. The method of claim 1, further comprising:
    computing soft bits for each constellation symbol in the OFDM symbol having the first portion compensated, while applying to the compensated first portion a Signal to Interference and Noise Ratio (SINR) scaled by the relative scaling factor.

10. A receiver comprising a transceiver, a processor and a memory, wherein the memory contains instructions executable by the processor whereby the receiver is operative to compensate for a symbol consisting of a first portion and a second portion by, wherein the symbol is an Orthogonal Frequency Division Multiplexing (OFDM) symbol containing a set of constellation symbols in a modulation constellation, wherein the receiver is operative to:
    create a sequence of amplitude values comprising amplitude values of constellation symbols in the set that are mapped onto constellation points with highest amplitude values in the modulation constellation;
    derive a threshold based on the sequence; and
    estimate the length of the first portion based on the number of amplitude values preceding a first amplitude value in the sequence that is larger than the threshold;
    calculate an average power of the first portion and an average power of the second portion based on the length of the first portion;
    determine a relative scaling factor by which the average power of the first portion is scaled relative to that of the second portion; and
    compensate for the first portion based on the relative scaling factor.

11. The receiver according to claim 10, wherein the amplitude value of each constellation symbol comprises the amplitude of its real part and/or the amplitude of its imaginary part.

12. The receiver according to claim 10, operative to:
    derive, as the threshold, an average of a number of values at the beginning of the sequence and that number of values at the end of the sequence.

13. The receiver according to claim 10, further operative to:
    obtain an envelope of the sequence by applying a low pass filter to the sequence, wherein the threshold is an average of a number of values at the beginning of the envelope and that number of values at the end of the envelope and the length of the first portion based on the number of values preceding a first value in the envelope that is larger than the threshold.

14. The receiver according to claim 10, further operative to: remove, prior to said deriving, a number of amplitude values from the sequence, the number being dependent on a ratio of a length of a cyclic prefix in the OFDM symbol to a length of the OFDM symbol.

15. The receiver according to claim 10, operative to:
    estimate the length of the first portion based on a difference between a timing advance associated with the symbol and a timing advance associated with another symbol that overlaps the symbol over the first portion.

16. The receiver according to claim 10, further operative to: prior to said setting, determine that a ratio of the length of the first portion to a length of the symbol does not exceed a predetermined upper limit at a given coding rate.

* * * * *